US009609799B2

(12) United States Patent
Henry

(10) Patent No.: US 9,609,799 B2
(45) Date of Patent: *Apr. 4, 2017

(54) REMOTE LEVELING OF TILLAGE IMPLEMENTS USING THREE WAY VALVES

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,498

(22) Filed: Dec. 2, 2014

(65) Prior Publication Data

US 2015/0156948 A1 Jun. 11, 2015

Related U.S. Application Data

(60) Provisional application No. 61/914,686, filed on Dec. 11, 2013.

(51) Int. Cl.
*A01B 63/10* (2006.01)
*A01B 63/22* (2006.01)
*A01B 21/08* (2006.01)

(52) U.S. Cl.
CPC ........... *A01B 63/22* (2013.01); *A01B 21/083* (2013.01)

(58) Field of Classification Search
CPC ..... A01B 63/002; A01B 63/008; A01B 63/10; A01B 63/14; A01B 63/22
USPC .................................................. 172/663, 664
See application file for complete search history.

(56) References Cited

U.S. PATENT DOCUMENTS

| | | | |
|---|---|---|---|
| 3,750,757 A | 8/1973 | Saetti | |
| 4,354,688 A | 10/1982 | Swanson | |
| 4,600,060 A * | 7/1986 | Winter | A01B 63/32 172/4 |
| 4,821,806 A | 4/1989 | Winter | |
| 4,913,070 A | 4/1990 | Morrison, Jr. | |
| 4,967,851 A | 11/1990 | Barber | |
| 5,427,182 A | 6/1995 | Winter | |
| 5,957,218 A | 9/1999 | Noonan et al. | |
| 6,129,157 A | 10/2000 | Noonan et al. | |
| 6,164,385 A | 12/2000 | Buchl | |
| 6,698,523 B2 | 3/2004 | Barber | |
| 6,701,857 B1 | 3/2004 | Jensen et al. | |

(Continued)

OTHER PUBLICATIONS

"Farm King Tillage Equipment" brochure taken from http://www.farm-king.com/downloads/tillage/brochure/FK-Tillage.pdf, May 1, 2013 (28 pages).

*Primary Examiner* — Gary Hartmann
(74) *Attorney, Agent, or Firm* — Rebecca L. Henkel; Rickard K. DeMille

(57) ABSTRACT

An agricultural implement having agricultural implement for supporting a plurality of gangs of disk blades extending generally laterally relative to a forward travel direction. The implement has carrier frames pivotally connected to wheel assemblies for controlling the height of the carrier frames relative to the ground through hydraulic actuators acting on the wheel assemblies. A hydraulic control unit enables independent and individual control of each actuator through the use of three way valves that selectively connect or lock individual actuators.

10 Claims, 10 Drawing Sheets

(56) References Cited

U.S. PATENT DOCUMENTS

| | | | |
|---|---|---|---|
| 7,686,095 B2* | 3/2010 | Batthala | A01B 63/1117 172/2 |
| 8,235,130 B2 | 8/2012 | Henry et al. | |
| 8,275,525 B2 | 9/2012 | Kowalchuk et al. | |
| 8,544,397 B2* | 10/2013 | Bassett | A01C 7/205 111/135 |
| 8,544,398 B2* | 10/2013 | Bassett | A01C 7/205 111/135 |
| 8,763,713 B2* | 7/2014 | Bassett | A01C 5/06 111/135 |
| 8,776,702 B2* | 7/2014 | Bassett | A01C 7/205 111/135 |
| 8,985,232 B2* | 3/2015 | Bassett | A01C 7/205 111/135 |
| 9,055,712 B2* | 6/2015 | Bassett | A01B 61/044 |
| 9,107,337 B2* | 8/2015 | Bassett | A01B 71/02 |
| 9,107,338 B2* | 8/2015 | Bassett | A01B 71/02 |
| 9,232,687 B2* | 1/2016 | Bassett | A01B 61/044 |
| 9,301,438 B2* | 4/2016 | Sauder | F15B 11/042 |
| 9,301,439 B2* | 4/2016 | Gilstring | A01B 49/027 |
| 9,307,688 B2* | 4/2016 | Adams | A01C 7/203 |
| 9,363,939 B2* | 6/2016 | Henry | A01B 63/22 |
| 2012/0048160 A1 | 3/2012 | Adams et al. | |
| 2013/0213676 A1* | 8/2013 | Bassett | A01C 7/205 172/260.5 |
| 2013/0319698 A1* | 12/2013 | Adams | A01C 7/203 172/4 |
| 2014/0156154 A1* | 6/2014 | Ryder | A01B 63/32 701/50 |
| 2015/0073668 A1* | 3/2015 | Achen | A01B 49/04 701/50 |
| 2015/0156950 A1* | 6/2015 | Henry | A01B 51/04 172/1 |
| 2015/0156951 A1* | 6/2015 | Henry | A01B 63/22 172/664 |
| 2015/0156952 A1* | 6/2015 | Henry | A01B 63/22 172/1 |
| 2015/0264857 A1* | 9/2015 | Achen | A01B 49/06 111/149 |
| 2015/0373901 A1* | 12/2015 | Bassett | A01C 7/205 172/1 |
| 2016/0100517 A1* | 4/2016 | Bassett | A01B 61/044 172/1 |

* cited by examiner

REMOTE LEVELING OF TILLAGE IMPLEMENTS USING THREE WAY VALVES

CROSS REFERENCE TO RELATED APPLICATIONS

This is a non-provisional application based upon U.S. provisional patent application Ser. No. 61/914,686, entitled "REMOTE LEVELING OF TILLAGE IMPLEMENTS USING THREE WAY VALVES", filed Dec. 11, 2013, which is incorporated herein by reference.

BACKGROUND OF THE INVENTION

1. Field of the Invention

The present invention relates to farm implements, and, more particularly, to systems and methods for maintaining such implements level relative to the soil.

2. Description of the Related Art

In the continuing quest for providing greater efficiency in the operation of farm implements, machines have been constructed to have ever increasing lateral spans relative to a tractor or central unit propelling the unit over a field. When the span increases to realize greater efficiency and speed, the criteria of having a uniform and level tool contact with the soil becomes extremely critical. Equipment with significant lateral spans has many different joints and is usually articulated to enable transport to and between fields.

An area of special importance to level positioning of farm implements is found in the tillage field. The desirable outcome is a uniform physical depth of the tillage and a uniform entry of the disk blades or harrows into the soil. The need to have a level positioning of the implement is made more challenging with the common use of hydraulic actuators which control the depth of penetration of the disk blades or other tools. In current practice, hydraulic actuators are connected in series and it is possible through normal operation for hydraulic fluid leakage to make the actuators out of sync with one another. In addition, field conditions, such as wheel loading and other variables, require an adjustment to the synchronization of the different sections of the tillage implement, thereby requiring the operator to dismount from a tractor and make manual adjustments.

It is current practice to partially counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished.

It has been proposed in co-pending application entitled "Remote Leveling of Tillage Implements" to provide individual adjustment of each actuator to improve the efficiency and flow of tillage operations. This is done by sensing actual actuator displacement and applying individual correction. While the sensing and correction are done individually, the hydraulic connection may be one in which each actuator has a supply and return line to it. This adds to the number of hydraulic lines and therefore the complexity and cost.

What is needed in the art therefore, is an efficient apparatus and method for maintaining agricultural implements in a level position relative to the soil by individual adjustment but with a minimum of hydraulic lines.

SUMMARY OF THE INVENTION

An advantage of the present invention is a more accurate and efficient synchronization of multiple sections of a farm implement.

In one form, the invention is an agricultural implement spanning a lateral distance relative to a forward direction. The implement has a plurality of interconnected carrier frames, each for supporting a plurality of soil engaging tools. At least one supporting element is carried by each carrier frame for variably positioning the carrier frame relative to the soil. A hydraulic actuator has a housing, in which a piston is displaceable and an output shaft connected thereto variably extending from said actuator housing and connected between each supporting element and the respective carrier frame for varying the position of the respective carrier frame relative to the soil. A sensor determines the displacement of the output shaft relative to the housing of each of the actuators. A source of pressurized hydraulic fluid is connected to a hydraulic control unit for directing pressurized hydraulic fluid to each actuator to move the actuator independently in response to a signal input. An electronic control unit "ECU" receives a desired input signal and compares it to the signal from the sensor to send a resulting signal to the actuator control unit for varying the position of each elongated element to reach the desired signal input for the system. A pair of hydraulic lines extend from the hydraulic control unit for connection with the actuators. Valves controllable by the ECU individually, selectively one of bypassing and connecting the actuator to the hydraulic control unit so that the actuators may be controlled individually or in unison.

In another form, the invention is a method of leveling an agricultural implement relative to the soil with the agricultural implement including a plurality of articulated carrier frames, each for supporting a plurality of soil engaging tools and having at least one supporting element carried by the carrier frame for variably positioning the carrier frame relative to the soil. Hydraulic actuators are provided for each carrier frame with each actuator having a housing, in which a piston is displaceable and an output shaft connected thereto variably extending from said actuator housing and connected between the supporting elements and the carrier frame for setting the position of the carrier frame relative to the soil. The method includes the steps of applying hydraulic fluid to the first of the actuators closest to the source of hydraulic pressure and adjusting it with the adjacent actuators being moved as the first actuator is adjusted. Thereafter, the first actuator is locked from the hydraulic fluid and adjusting the second actuator at which time the subsequent actuators move also with the adjustment of the second. Thereafter the second actuator and first actuator are locked from the hydraulic fluid and the third actuator is adjusted with any subsequent actuators being moved with it. When all the actuators are adjusted, the actuators are reconnected in a series connection so as to make them move in unison.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
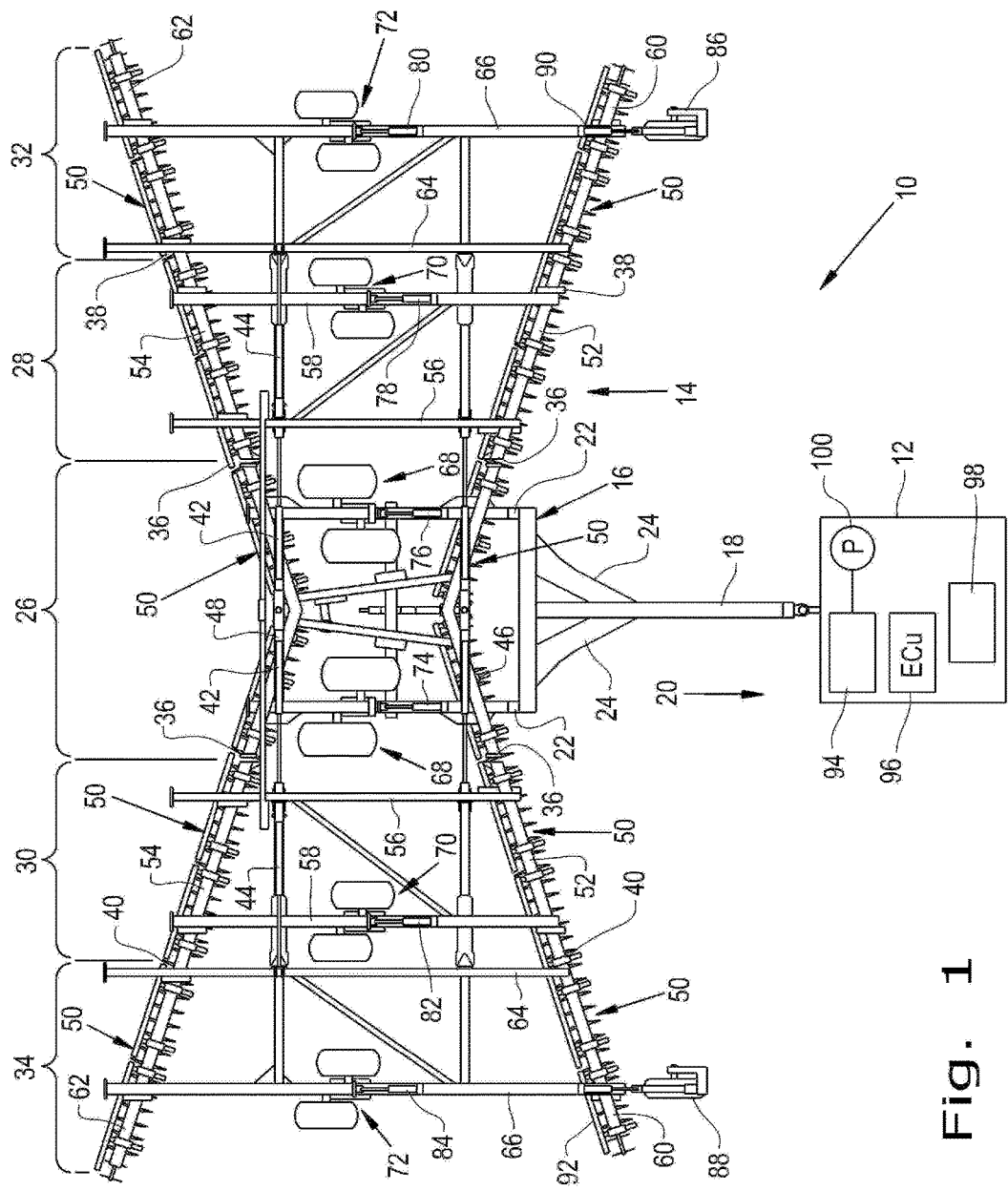
FIG. 1 illustrates a tillage implement including a support of disk blades embodying the present invention, being pulled by a tractor shown in schematic fashion.

Referring now to the drawings, and more particularly to FIG. 1, there is shown a tillage apparatus 10 which generally includes a tractor 12 shown schematically and an agricultural tillage implement 14 for tilling the soil prior to seeding. It should be noted that many different tools may be employed with the tillage implement 14 beyond the embodiment shown.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

The tillage implement 14 has a center section 26, an inner right wing section 28 and an outer right wing section 32 as viewed in FIG. 1. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted, the frame elements 46 and 48 extend generally laterally with respect to the direction of movement 20 of the agricultural implement. Frame members 46 and 48, however, extend at an angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

The various sections 26, 28, 30, 32 and 34 of the tillage implement 14 are positioned at variable positions relative to the soil and thus set the position of the gangs of disk harrows 50 above the soil and the depth they cut into the soil. As illustrated, the variable support elements are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to support and variably position inner wing sections 28 and 30 relative to the soil. In addition, wheel sets 72 are pivotally mounted on frame members 66 to support and variably position outer wing sections 32 and 34 at a variable distance relative to the soil. Hydraulic actuators 74 and 76 manipulate wheel sets 68 to establish the distance of center section 26 relative to the soil. Actuators 78 and 80 support and variably position sections 28 and 32 relative to the soil. Finally, actuator assemblies 82 and 84 support and variably position sections 30 and 34 relative to the soil.

In addition, castor wheel assemblies 86 on section 32 and 88 on section 34 orient the for and aft angle of the tillage implement 14 relative to the soil. Actuators 90 and 92 are employed for this purpose.

The actuators described above are shown as hydraulic and for this purpose a hydraulic control unit 94 is mounted in the tractor 12 and has a pump 100 for pressurizing hydraulic fluid to control the actuators. The hydraulic control unit 94 receives inputs from an electronic control unit (ECU) 96 which receives various inputs set out below, in addition to an operator input through control unit 98.

Figure 2:
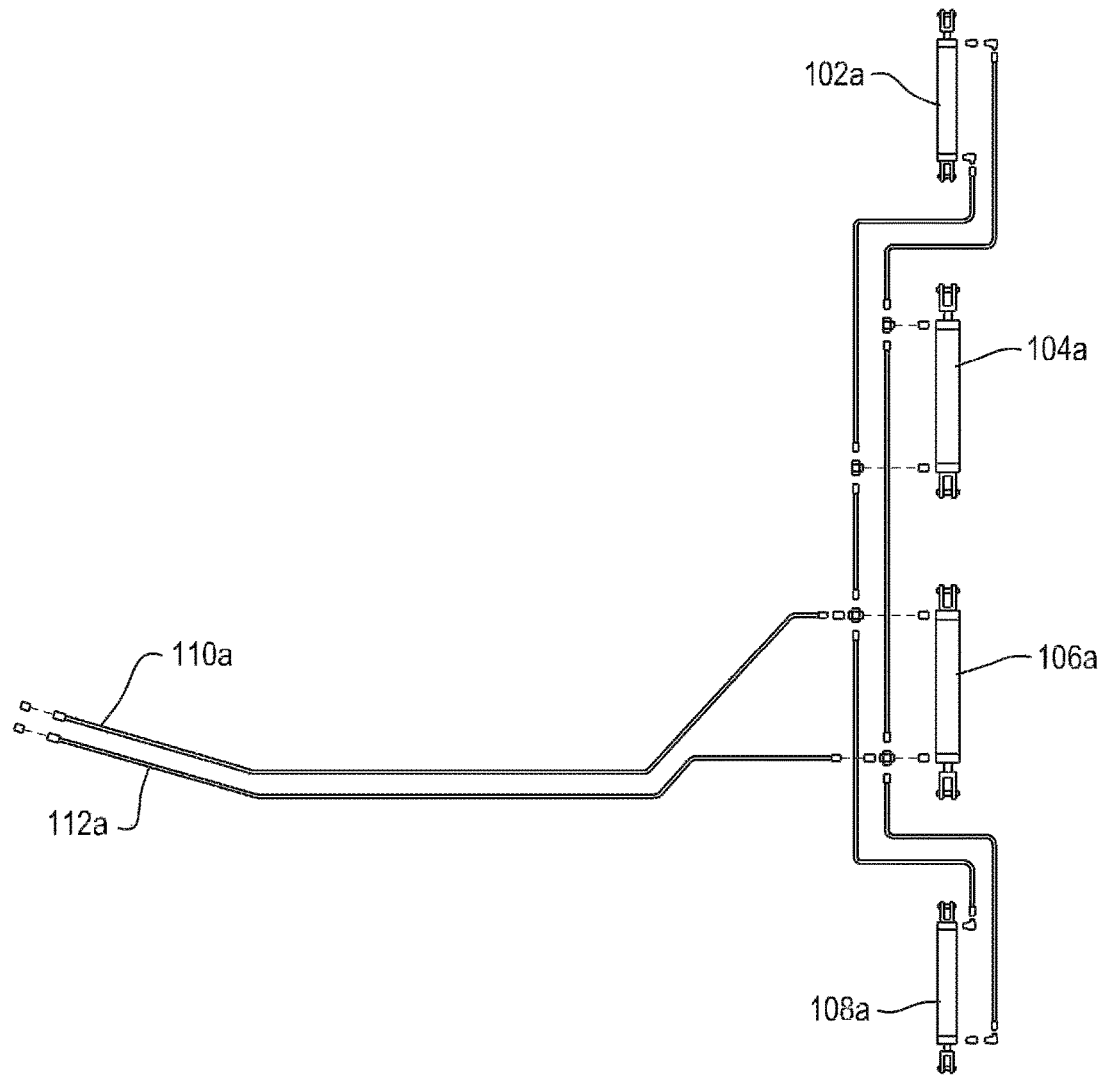
FIG. 2 is a plan view of a hydraulic system shown in the prior art for the tillage implement of FIG. 1.

The hydraulic interconnection established by a typical prior art system for elevating the various sections of the tillage implement 14 is shown in FIG. 2. In this arrangement, each of a set of actuators 102a, 104a, 106a and 108a is connected to a hydraulic control pressure by supply conduits 110a and 112a. As is illustrated in FIG. 1 the actuators 102a-108a are connected in parallel so that the pressure uniformly applies to each actuator in the set. As described above however, the actuators may become out of sync due to linkage past a piston thus requiring additional steps in the field to ensure synchronization of the actuators.

Figure 3:
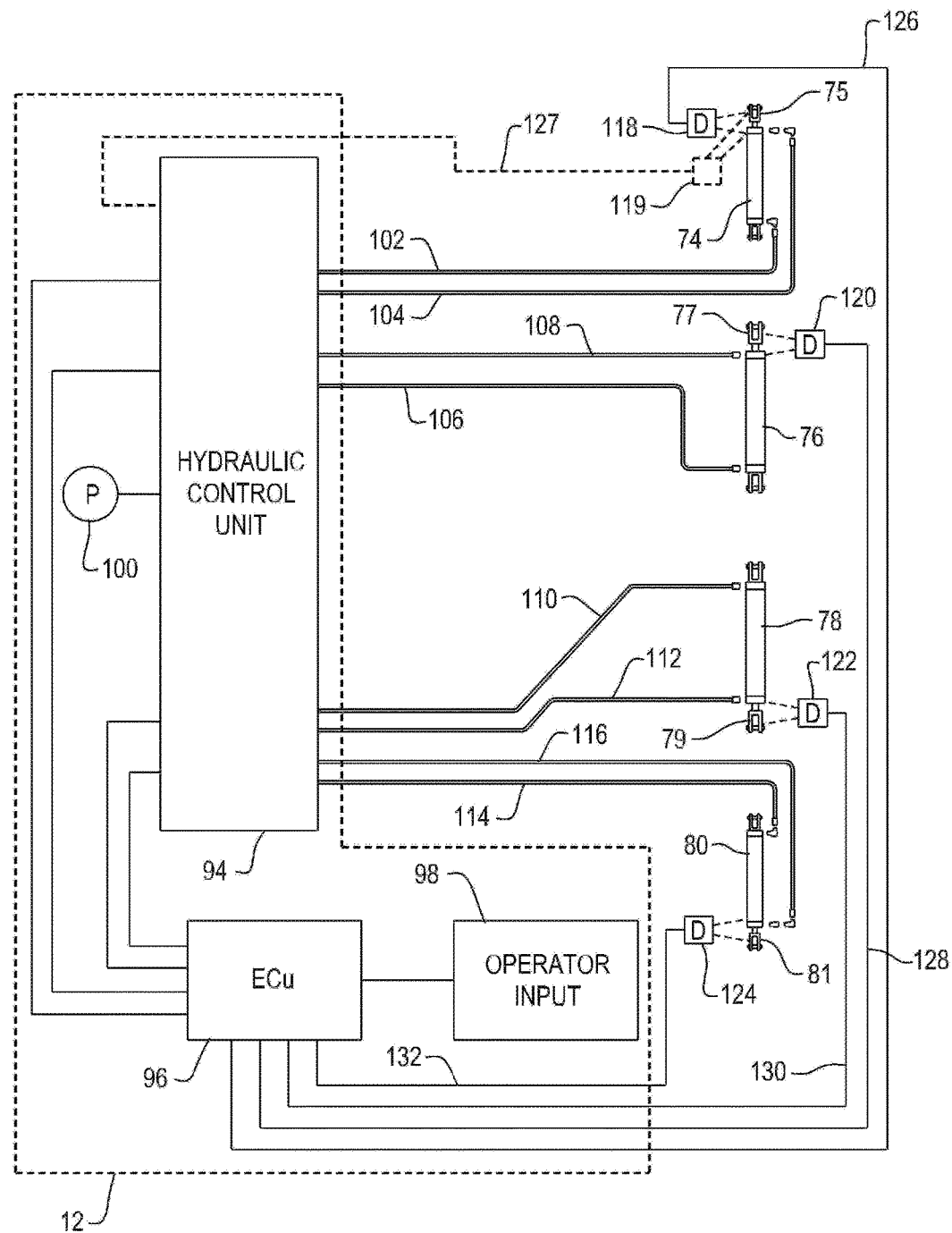
FIG. 3 is a plan view of a hydraulic system for the tillage implement of FIG. 1.

In accordance with the present invention, a control system and method set forth in FIG. 3 overcomes these difficulties. FIG. 3 shows actuators 74, 76, 78 and 80. The operation of the additional actuators is similar and is omitted to enable a better understanding of the present invention. Each of the actuators 74, 76, 78 and 80 has an output shaft 75, 77, 79 and 81, respectively extending from the actuator body. Each actuator has a piston displaceable within a chamber in the actuator body and connected to the respective output shaft.

The piston end of the actuator 74 is connected to the hydraulic control unit 94 by a hydraulic line 102. The output shaft end of actuator 74 is connected to the hydraulic control unit 94 by a return line 104. In similar fashion, the piston end of actuator 76 is connected by line 106 and a return line 108 is provided to control unit 94. The piston end of actuator 78 is connected to hydraulic control unit 94 by line 110 and the return line is designated as 112. Finally, the piston end of actuator 80 is connected to hydraulic control unit 94 via hydraulic line 114 and a return line 116 is provided. The independent connection of the actuators to the hydraulic control unit 94 will enable independent establishment of the height of the units relative to the soil.

The relative physical position of the hydraulic control unit 94 may be different than the one shown in FIG. 3, depending up on the application for the unit. It may be a single module or may be provided in individual control sections. However the hydraulic control unit 94 is positioned relative to the actuators, it permits independent manipulation of the actuator output shafts as will be described below.

Figure 10:
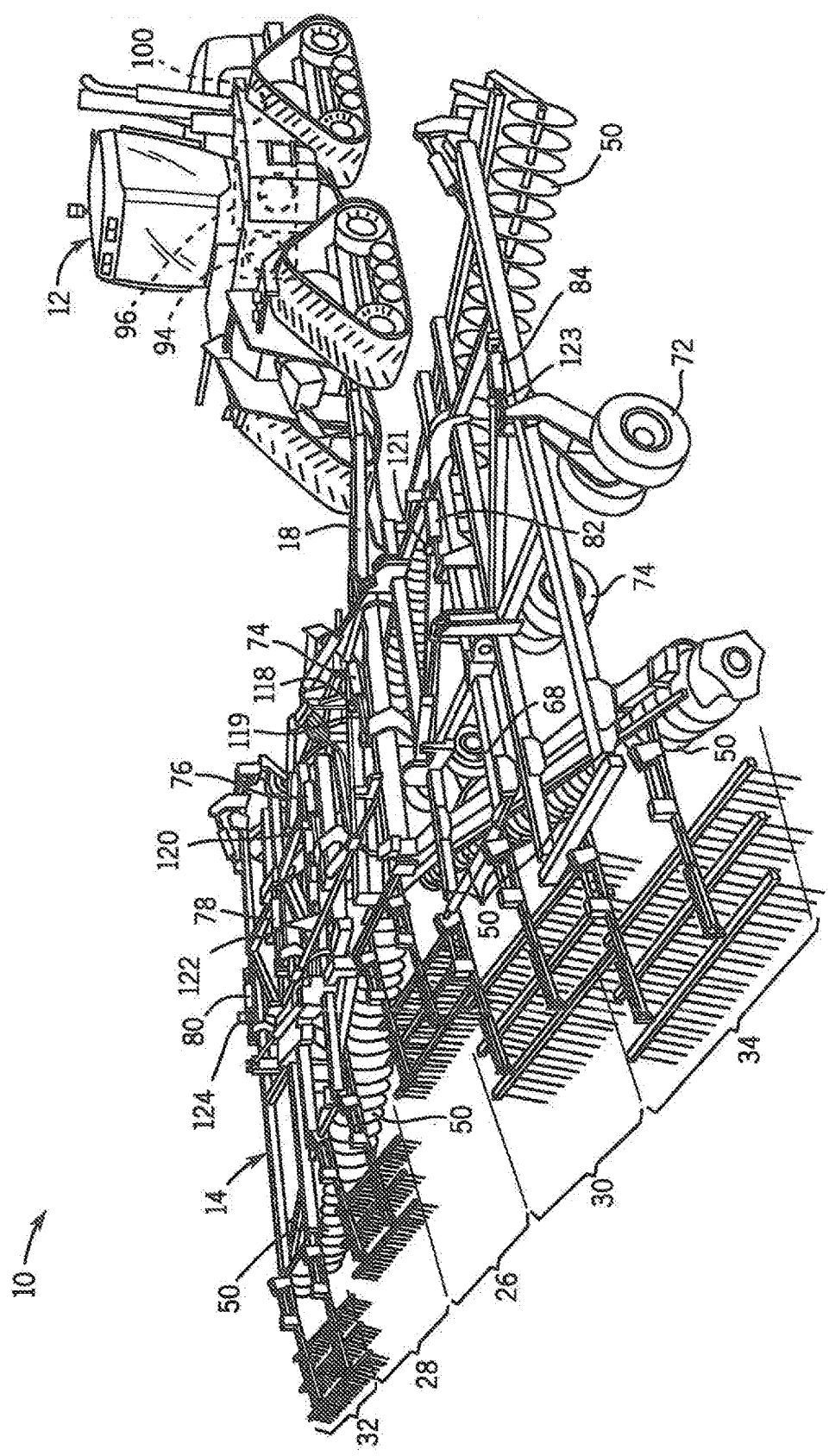
FIG. 10 is a perspective view, illustrating the frame sections, some of the supporting elements, the actuators, and the sensors of the present invention.

For this purpose, a displacement detecting device is provided to provide a signal proportional to the displacement of each output shaft relative to the body of the respective actuator. Alternatively, a displacement detecting device may be employed to provide a signal reflecting the position of the carrier frame relative to the soil at the frame supports. In addition to the displacement signal, a signal reflecting the rate of change of displacement or $\Delta D/\Delta T$ is provided. As shown in FIG. 3, the displacement indicating devices are identified as 118 for actuators 74, 120 for actuators 76, 122 for actuator 78 and 124 for actuator 80. As illustrated in FIG. 10, those actuators 74, 76, 78 and 80 and their respective displacement devices 118, 120, 122 and 124 are shown. In addition the displacement indicating devices are identified as 121 for actuator 82 and 123 for actuator 84. The displacement indicating devices 118, 120, 122 and 124 provide signal inputs to the ECU via lines 126, 128, 130 and 132, respectively. Similarly, it will be understood that displacement indicating devices 121 and 123 also will provide signal inputs to the ECU via lines (not shown). The displacement indicating devices are devices that provide appropriate control signals that are proportional to the displacement of the output shaft relative to the various actuators and preferably the rate of change of displacement. The interconnections with the output shafts and actuators are not included to enable a better focus on the basic principle of the invention. Any one of a number of sensors may be employed for this purpose.

As shown in FIGS. 3 and 10, the displacement sensors and A D/A T sensors are incorporated into a single unit. However, the $\Delta D/\Delta T$ signal may be provided in a separate unit 119 shown in dashed lines for actuator 74. Unit 119 may be connected to ECU 96 by a line 127, also shown as a dashed line. Similar units would be provided for actuators 76, 78, 80, 82, 84 if it is desired to use separate units for displacement and $\Delta D/\Delta T$ The invention is applied to the tillage implement of FIG. 1 by initially setting the implement on a level surface for calibration. The implement 14 is raised to the maximum extent where each individual actuator has its output shaft at its maximum length. At this point, a bypass port in the piston provides a bypass for return flow back to the actuator control unit 94. This ensures that any air entrained in the system due to assembly or other reason is passed to the hydraulic system. The implement 14 is then lowered so that the tools, in this case the gangs of disk blades 50, just touch the level surface. Preferably this surface would be a level concrete surface. Once the actuators are adjusted to reach this point, individual readings of the displacement between the actuator rod and the actuator body are taken with full hydraulic fluid in the chambers. The displacement signals of the individual actuators are stored in the ECU 96. The resultant individual actuator displacement signals are considered the synchronized set point for the signals. It should be apparent to those skilled in the art that the use of placing the tools at the plane of the soil is but one of a number of reference points that define a unitary plane used in defining the reference plane.

The tillage implement is then in a position to have each of the actuators raise and lower the individual frame elements in unison to provide a uniform height above the ground and a uniform depth when the gangs of disk blades 50 are positioned in the soil. Periodically during the operation of the tillage implement, the readings of the individual actuators are determined and, if they deviate from the set point initially established, the hydraulic control system provides appropriate hydraulic fluid to achieve the same set point. This is done independently of the other actuators so that correction is applied individually to each actuator unit. The tillage implement 14 is then able to provide accurate depth of penetration among the gangs of disk harrows 50.

The implement may be adjusted additionally in the field. In this procedure, the operator prepares a test run into the soil in a field and then measures the depth of the penetration of the disk blades. To the extent that it is necessary to make a minor adjustment, the individual cylinder that is out of sync with the remaining cylinders is adjusted and a new set point is established as the level uniform plane. This ensures that field conditions such as wheel loading and other factors have a minimal and easily correctable impact on the tillage operation.

In addition, the actuators are corrected for the differential rate of displacement change by the $\Delta D/\Delta T$ so that the entry of the gangs of disk blades 50 is uniform at the beginning of the field and the withdrawal is uniform at the end of the field. The process of recalibration may be made automatic so that it does not interfere with the immediate operator directed tillage over a field and preparing the soil.

The hydraulic system illustrated in FIGS. 4-9 illustrates a preferred hydraulic system for the tillage implement of FIG. 1. The system shown in FIGS. 4-9 is described by specifically referring to FIG. 4. The system will be explained by using actuators 74, 76 and 78. The additional actuator or actuators are omitted from the description to enable a clearer understating of the invention. The pump for pressurizing the hydraulic fluid is designated as 100 and the hydraulic control unit 94 schematically shown in FIG. 3 is connected to the actuators as will be explained below. A dashed line designated as 94 is used to indicate the valves and lines below are also part of the hydraulic control unit. In this system there is a hydraulic line 180 connected to the hydraulic control unit 94 and a second hydraulic line 182 for hydraulic fluid between the actuators and the hydraulic control unit 94. In this system the line 180 connects to a first three-way valve 184 and line 186 which is connected to the piston end 188 of actuator 74. The output shaft end 190 of actuator 74 has a line 192 leading to an additional three-way valve 194. From there a line 196 extends to the piston end 198 of actuator 76. The output shaft end 200 of actuator 76 has a line 202 extending to a third three-way valve 204. Finally, a line 206 extends to the piston end 208 of actuator 78. A line 210 at the output shaft end of actuator 78 connects with line 182 leading to the hydraulic control unit 94. Bypass line 212 leads from three-way valve 184 and has a connecting line 214 to valve 194 and a connecting line 216 to three way valve 204.

The three-way valves are each set up so that when they are de-energized there is flow from the adjacent hydraulic line to the respective piston end of the associated actuator. In other words, when valves 184, 194 and 204 are de-energized, the flow is from line 180 to 186, 192 to 196, and 202 to 206, respectively. When each solenoid valve or three-way valve is energized there is flow between the adjacent hydraulic line and the bypass line. In other words, when valve 184 is energized, flow to 186 is blocked and flow is directed from line 180 to line 212. Correspondingly, when valve 194 is energized, the flow is from line 192 to line 214 with the flow to 196 blocked. Finally, when valve 204 is energized, the flow is from line 202 to line 216 with the line 206 blocked.

The sensors 118, 120 and 122 are employed to measure the actual displacement of output shaft 75, 77 and 79 but are not shown in these figures to aid in the understanding of the invention. There are signal inputs from the ECU 96 to the valves and these are made through line 220 for valve 184, line 222 for valve 194 and line 224 for valve 206.

Figure 4:
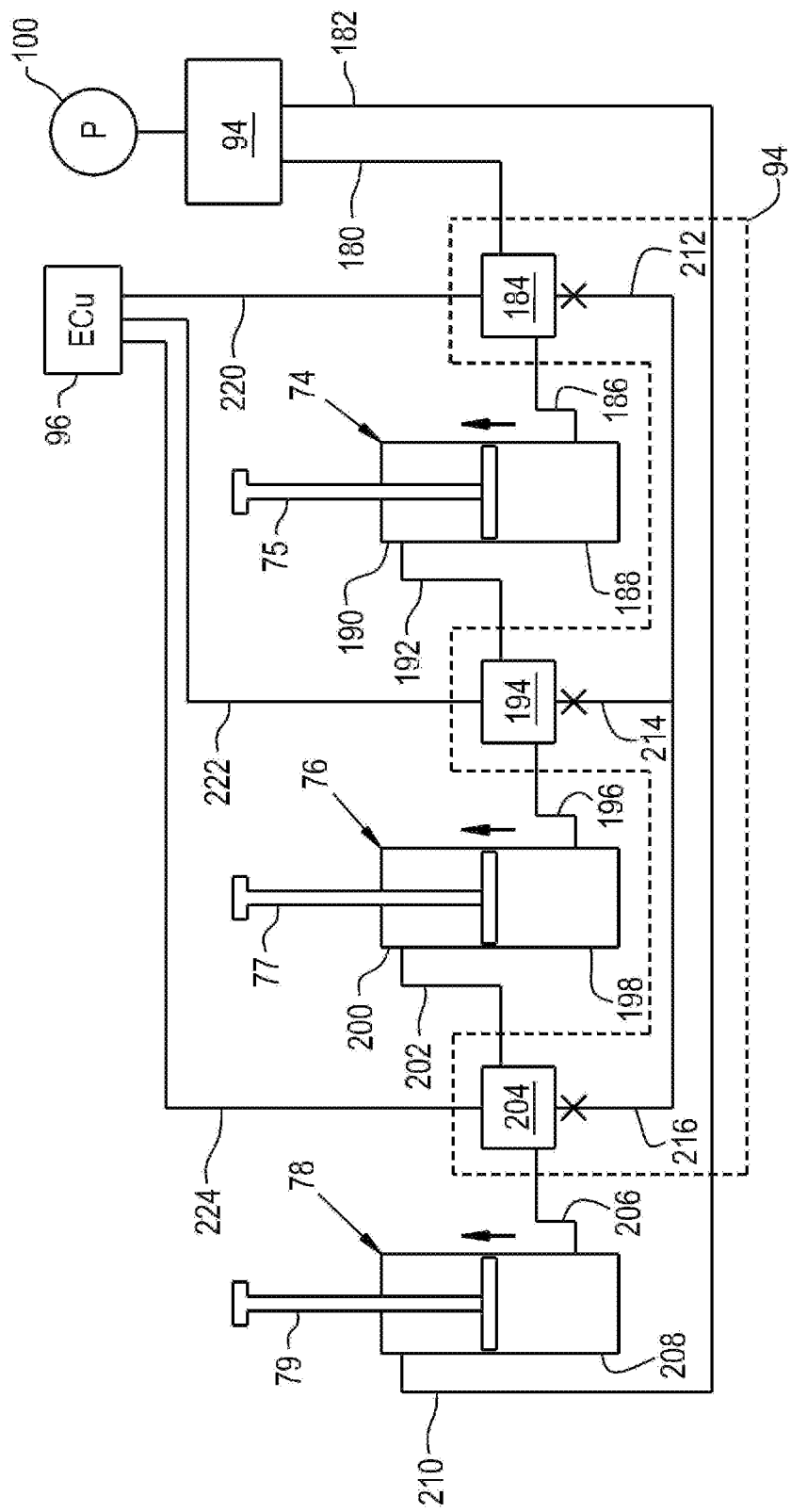
FIG. 4 is a plan view of a preferred hydraulic system for the tillage implement of FIG. 1 in a first state.
Figure 5:
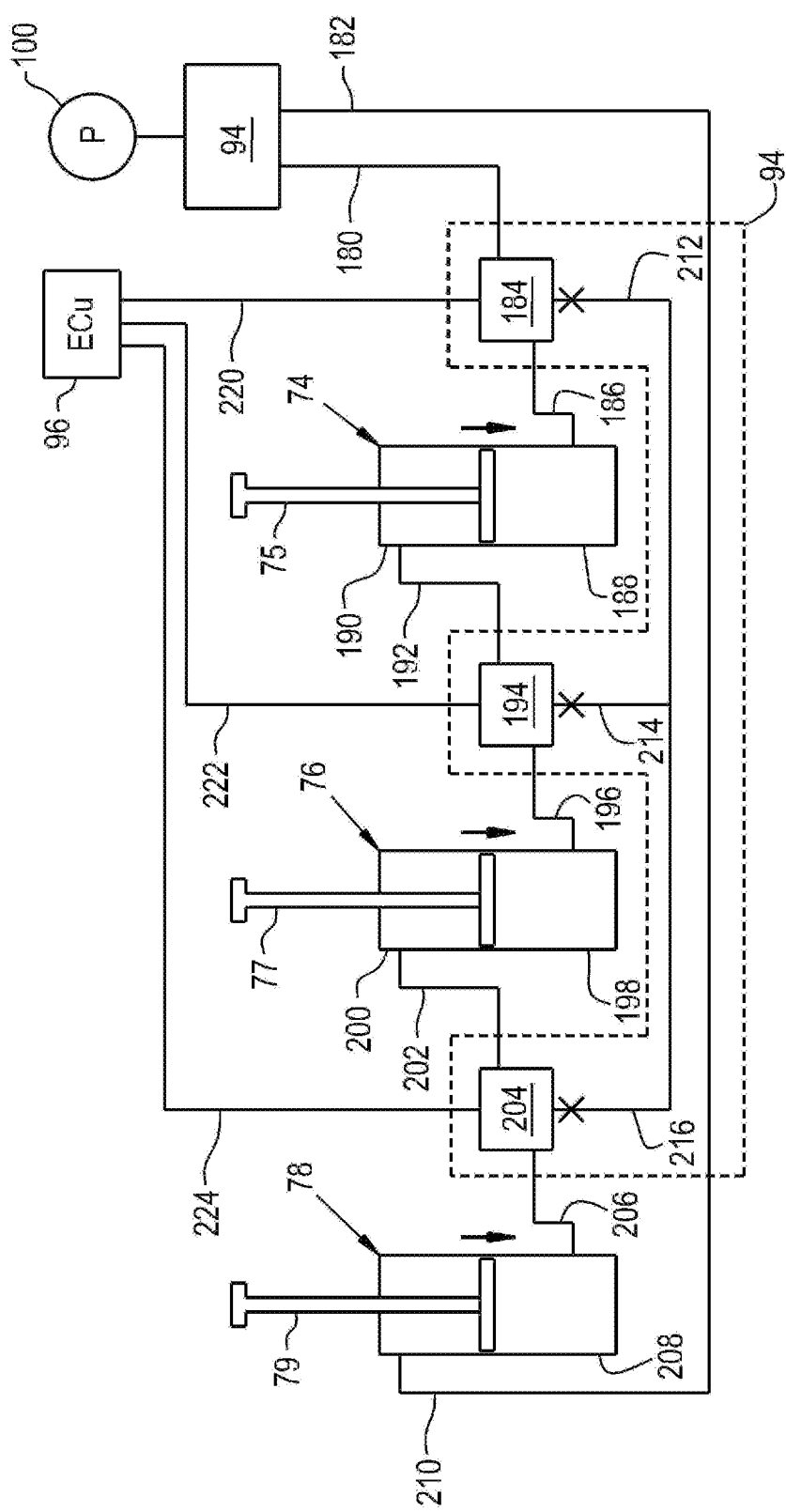
FIGS. 5-9 show the hydraulic system of FIG. 4 in different states.
Figure 6:
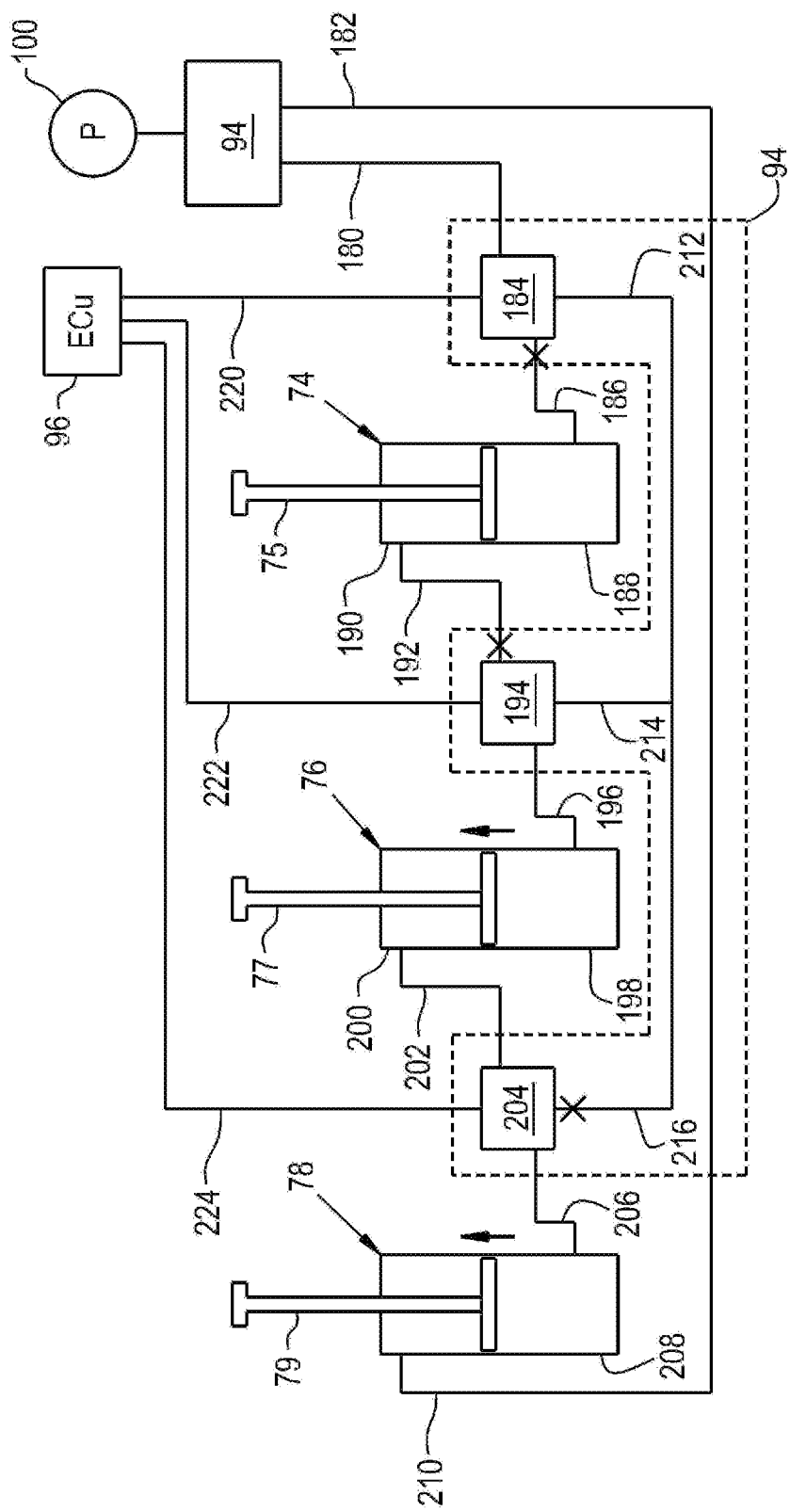

The arrangement set forth above enables a traditional series connection between the actuators but with the possibility to minimize the number of hydraulic lines deployed on the carrier frame and still retain the ability to provide individual adjustment. FIG. 4 shows the state where actuator 74 is to be adjusted. In this case, the valves 184, 194 and 204 are all de-energized so that the flow to the piston end 98 of actuator 74 causes the output shaft to be adjusted in accordance with the signals of the corresponding sensor. Since actuators 76 and 78 are also in series, they move also. The view of FIG. 4 shows a movement of the output shaft 75 toward extension and the view in FIG. 5 shows the shaft 75 retracting. In this case, the output shafts 77 and 79 retract also.

Figure 7:
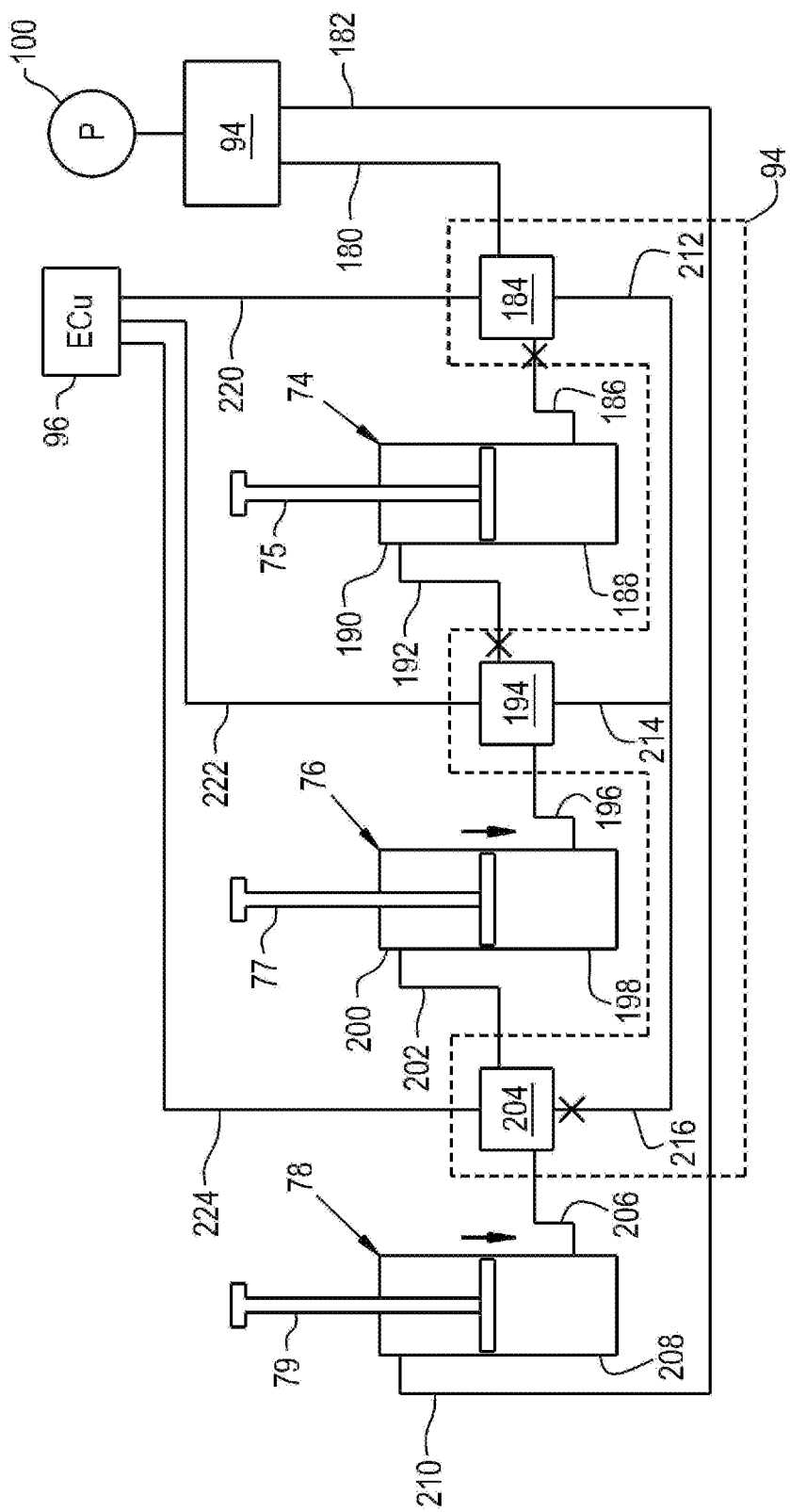

Once the cylinder 74 is adjusted, the system moves to actuator 76. In this condition, shown in FIG. 6, valve 184 is energized so that flow to the piston end 188 of actuator 74 is blocked and the flow passes through line 112. In this case, the solenoid 194 is energized so that flow occurs between line 214 and 196 to the piston end 198 of actuator 76. This causes the hydraulic flow from the actuator to be applied to the output shaft to move the output shaft 77 towards extension. At the same time the output shaft 79 of actuator 78 moves with it. The view in FIG. 7 shows the condition when the actuator is moving in a position to retract output shaft 77. In this case, the flow is back through line 212 and to the hydraulic control unit 94 through line 180.

Figure 8:
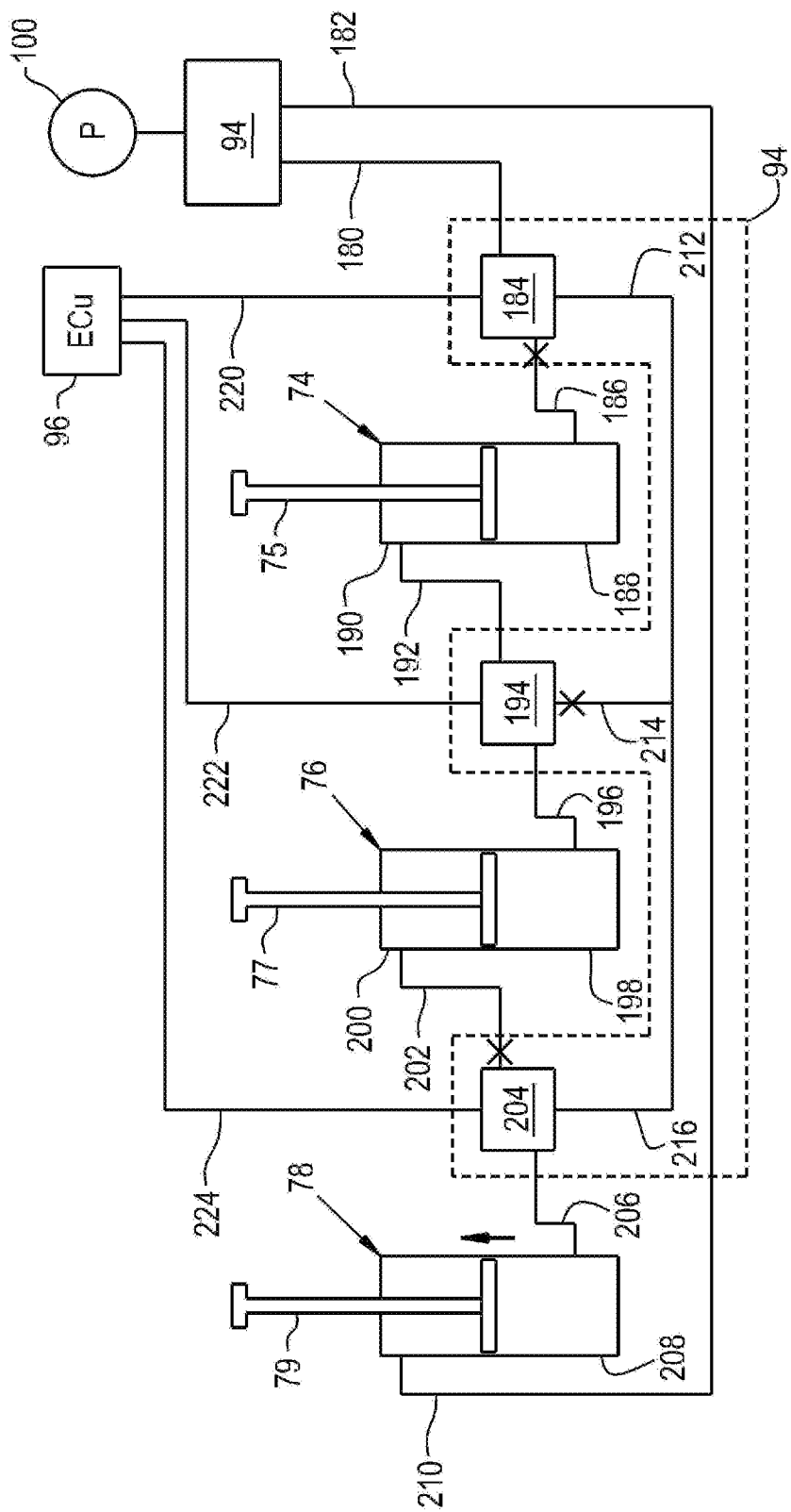
Figure 9:
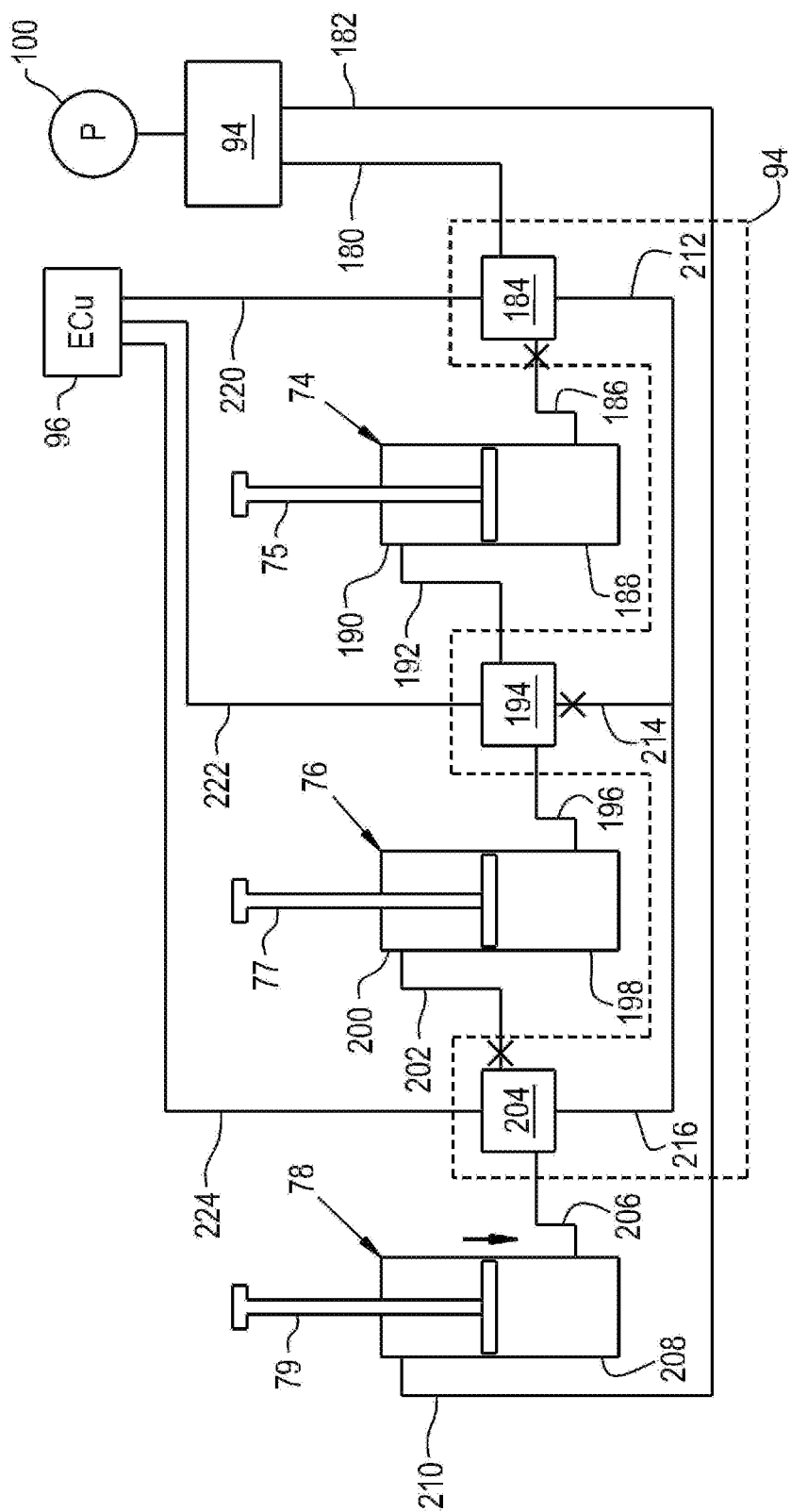

Once this is done, the actuator 78 is to be adjusted and in this case the actuator 74 and 76 are locked so that the flow is by line 212 to through valve 204 to the piston end 208 of actuator 78. FIG. 8 shows the output shaft 79 in an extension mode and FIG. 9 shows the output shaft 79 in a retracting mode. Once the actuator 78 is adjusted the valves 184, 194 and 204 are de-energized so that the actuators 74, 76 and 78 may act in unison as in a series connection. For additional actuators, the procedure for adjustment follows the same steps until all actuators are adjusted. The above system and method enables individual adjustment of the actuators, but with the traditional series connection between the actuators and resultant minimization of the hydraulic lines on the tillage implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural implement spanning a lateral distance relative to a forward direction, said implement comprising:
a plurality of carrier frames, each for supporting a plurality of soil engaging tools;
at least one supporting element carried by each carrier frame for variably positioning the carrier frame relative to the soil;
an hydraulic actuator having a housing, in which a piston is displaceable and an output shaft connected thereto variably extending from said actuator housing and connected between said each supporting element and said respective carrier frame for varying the position of said respective carrier frame relative to the soil;
a sensor determining the displacement of the respective carrier frame relative to the soil at said at least one supporting element;
a source of pressurized hydraulic fluid;
an hydraulic, control unit receiving said pressurized fluid and directing pressurized hydraulic fluid to said actuators to move said actuators independently in response to a signal input;
an electronic control unit (ECU) establishing a desired input signal and comparing it to the signal from each said sensor to send a resultant signal to said hydraulic control unit for varying the position of each actuator output shaft to reach the signal input
a pair of hydraulic lines extending from said hydraulic control unit for connection with said actuators; and
valves controllable by said ECU for individually selectively one of bypassing and connecting each actuator to said hydraulic control unit, whereby said actuators may be controlled individually or in unison.

2. The agricultural implement of claim 1, wherein each actuator has a piston end and a shaft end and said valves each have a first connection to the piston end of the adjacent valve.

3. The agricultural implement of claim 2, wherein the first of a plurality of valves has a second connection receiving an input from said hydraulic control unit and subsequent valves have a second connection from the output shaft end of the adjacent valve.

4. The agricultural implement of claim 3, wherein each of said valves have a third connection to a common line fluidly connecting them.

5. The agricultural implement of claim 4, wherein each valve has a fluid connection between the first and second connection when in the de-energized state and a fluid connection between connections 2 and 3 in the energized state, thereby enabling the valves to be connected or disconnected from the hydraulic circuit to said hydraulic control unit.

6. The agricultural implement of claim 1, wherein the valves in a de-energized state permit flow through said adjacent actuator and in an energized state blocks flow through said adjacent actuator.

7. The agricultural implement of claim 1, in which the variable positioning components are wheel assemblies pivotally connected to said carrier frames for varying the distance of said carrier frames relative to the soil.

8. The agricultural implement of claim 1, in which there is a pivotal connection between the plurality of carrier frames.

9. The agricultural implement of claim 8, having a center section with a pair of wheels supporting said carrier frame and at least one pair of outer carrier frames each being supported by a wheel assembly.

10. The agricultural implement of claim 1, in which the tools are gangs of disk blades for tilling the soil.

* * * * *